(12) United States Patent
Okano et al.

(10) Patent No.: US 8,568,917 B2
(45) Date of Patent: Oct. 29, 2013

(54) MATERIAL FOR CONTACT COMPONENTS OR BATTERY COMPONENTS, AND BATTERY USING THE SAME

(75) Inventors: Takuyuki Okano, Osaka (JP); Toshihiko Ikehata, Osaka (JP); Misao Iguchi, Hyogo (JP); Keiichi Hayashi, Hyogo (JP)

(73) Assignees: Panasonic Corporation, Osaka (JP); Katayama Special Industries, Ltd., Osaka (JP)

( * ) Notice: Subject to any disclaimer, the term of this patent is extended or adjusted under 35 U.S.C. 154(b) by 1252 days.

(21) Appl. No.: 12/304,277

(22) PCT Filed: Jun. 11, 2007

(86) PCT No.: PCT/JP2007/061747
§ 371 (c)(1),
(2), (4) Date: Dec. 11, 2008

(87) PCT Pub. No.: WO2007/145175
PCT Pub. Date: Dec. 21, 2007

(65) Prior Publication Data
US 2009/0325073 A1    Dec. 31, 2009

(30) Foreign Application Priority Data
Jun. 12, 2006   (JP) ................. 2006-162750

(51) Int. Cl.
*H01M 2/02* (2006.01)
*B32B 15/00* (2006.01)
*C25D 5/10* (2006.01)

(52) U.S. Cl.
USPC ......................................... 429/178; 428/684

(58) Field of Classification Search
USPC .......................................... 429/221; 428/684
See application file for complete search history.

(56) References Cited

U.S. PATENT DOCUMENTS

| 5,955,141 | A | 9/1999 | Soutar et al. | |
| 2004/0197661 | A1* | 10/2004 | Utsunomiya et al. | 429/247 |

FOREIGN PATENT DOCUMENTS

| JP | 51-2054 | | 1/1976 | |
| JP | S51-002054 | * | 1/1976 | ........... C23C 3/00 |
| JP | 60-151956 | | 8/1985 | |
| JP | 61-051749 | | 3/1986 | |
| JP | 6-065747 | | 3/1994 | |
| JP | 08-232072 | A | 9/1996 | |
| JP | 2000-038681 | | 2/2000 | |
| JP | 2004-039609 | | 2/2004 | |
| WO | WO 01/11114 | A1 | 2/2001 | |

OTHER PUBLICATIONS

Japanese Office Action issued in Japanese Patent Application No. 2006-162750 dated Jul. 26, 2012.

* cited by examiner

*Primary Examiner* — Barbara Gilliam
*Assistant Examiner* — Steven Scully
(74) *Attorney, Agent, or Firm* — McDermott Will & Emery LLP (57) ABSTRACT

A material for contact components or battery components, which includes a metal sheet having a surface layer portion containing a first metal element, the metal sheet including a Cr-containing steel plate or a surface-treated steel plate, and at least a part of the first metal element on an outermost surface of the surface layer portion being substituted by a second metal element having a nobler standard electrode potential than the first metal element, the second metal element being deposited on the outermost surface in a state of a particulate metal, oxide, or hydroxide.

10 Claims, 4 Drawing Sheets

MATERIAL FOR CONTACT COMPONENTS OR BATTERY COMPONENTS, AND BATTERY USING THE SAME

RELATED APPLICATIONS

This application is the U.S. National Phase under 35 U.S.C. §371 of International Application No. PCT/JP2007/061747, filed on Jun. 11, 2007, which in turn claims the benefit of Japanese Application No. 2006-162750, filed on Jun. 12, 2006, the disclosures of which Applications are incorporated by reference herein.

TECHNICAL FIELD

The present invention mainly relates to a material for contact components or battery components, which can stably maintain a low surface resistance value for a long period of time.

BACKGROUND ART

For the material for contact components or battery components, steel plates (including steel strips) such as Cr-containing steel plate, surface-treated steel plate, and the like are widely used. For use intended for contact components, contact resistance value, solderability, and the like are considered important. For use intended for battery components, corrosion resistance, workability, and the like are considered important. In general, as the steel plate intended for use for contact components, various types of surface-treated steel plates (e.g., nickel-plated steel plate, tin-plated steel plate, or copper-plated steel plate) and the like are used, from the perspective of obtaining low contact resistance value and good solderability. On the other hand, as the steel plate intended for use for battery components, Cr-containing steel plates, surface-treated steel plates (nickel-plated steel plate in particular), and the like are used, from the perspective of obtaining corrosion-resistance and workability.

In either of the intended use, the steel plate is required to maintain a low contact resistance value. However, a Cr-containing steel plate, while having high corrosion-resistance, also has a Cr oxide layer on the surface of the steel plate. Thus, the surface resistance value of a Cr-containing steel plate has a large value. In order to use a Cr-containing steel plate for contact components and battery components, the surface resistance value is required to be lowered by performing some kind of surface treatment.

For example, for a positive electrode case of a lithium primary battery, a stainless steel plate (Cr-containing steel plate) such as SUS304, SUS430, SUS444, and the like are mainly used. To the inner face side of the positive electrode case, a carbon paste is applied in order to lower the contact resistance value of the stainless steel plate. However, the process of applying the carbon paste is cumbersome, and a large encumbrance is required for drying the carbon paste. For this reason, equipment costs, labor costs, energy consumption, and the like increase, and it is difficult to attempt reduction in production costs.

Due to technological innovation, power conservation, and the like of nowadays, further improvement in performance is being required for various components. Associated with the above, improvements in performances of materials for contact components, battery components, and the like are also being strictly asked. Most notably, suppressing the temporal change in contact resistance value so as to stabilize the resistance value for a long period of time, has become a significant task. Materials having a low contact resistance value in no way inferior to the conventional ones and having a small temporal change in resistance value, are in demand.

Patent Document 1 proposes coating a current collector for an alkaline battery with a noble metal, in order to improve the degree of electrical conductivity of the current collector. For the noble metal, gold, iridium, palladium, platinum, rhodium, ruthenium, and the like are used. As the method of coating, sputtering, painting method, dipping method, air atomization method, electrolysis, chemical vapor deposition, physical vapor deposition, ultrasonic air atomization, flame spraying, electric heat spraying, plasma spraying, and the like are proposed.

Patent Document 2 proposes using a surface-treated cold-rolled steel plate for a cylindrically-shaped battery case. Surface treatment is given by heat-treating a cold-rolled steel plate, and then performing hot-dipped plating. From the perspective of reducing wrinkles due to deep drawing, nickel, cobalt, iron, bismuth, indium, palladium, gold, zinc, and the like are used for the plating.

[Patent Document 1] Japanese Laid-Open Patent Publication No. 2004-39609

[Patent document 2] Japanese Laid-Open Patent Publication No. 2003-525346

DISCLOSURE OF THE INVENTION

Problem to be Solved by the Invention

As described above, in the case of fabricating contact components, battery components, and the like by using steel plates, in order to lower the contact resistance value, surface treatment is required to be performed. However, there is the problem of the cost required for surface treatment being high.

Given this factor, an object of the present invention is to provide a material for contact components or battery components which is inexpensive and excellent in performance, by means of performing a simple treatment on a surface of a steel plate (e.g., Cr-containing steel plate, surface-treated steel plate, and the like).

Means for Solving the Problem

The inventors of the present invention, as a result of keenly pursued studies, found that by a simple treatment of bringing a surface of a steel plate into contact with an aqueous solution containing predetermined metal ions, the surface resistance value of the steel plate lowered and a low surface resistance value could be stably maintained for a long period of time.

The present invention relates to a material for contact components or battery components, which includes a metal sheet having a surface layer portion containing a first metal element. The metal sheet includes a Cr-containing steel plate or a surface-treated steel plate, and at least a part of the first metal element on an outermost surface of the surface layer portion is substituted by a second metal element having a nobler standard electrode potential than the first metal element. The second metal element is deposited on the outermost surface in a state of a particulate metal, oxide, or hydroxide. In the case where the metal sheet has two or more surface layer portions containing the first metal element, it is satisfactory if at least a part of the first metal element is substituted by the second metal element on the outermost surface of at least one of the surface layer portions.

For the Cr-containing steel plate, for example, a stainless steel plate can be used. In such a case, the first metal element will be, for example, iron.

For the surface-treated steel plate, for example, a stainless steel plate having a plated layer or a cold-rolled steel plate having a plated layer can be used. In such a case, it is desirable that the plated layer contains the first metal element, and that the first metal element is at least one selected from the group consisting of Ni, Sn, and Cu.

The second metal element is, for example, at least one selected from the group consisting of Pd, Pt, Ag, Au, In, Co, and Cu.

It is desirable that the second metal element contains a first group element, being at least one selected from the group consisting of Pd, Pt, Ag, and Au, and a second group element, being at least one selected from the group consisting of In, Co, and Cu.

It is desirable that the first group element is deposited in a shape of a particle. That is, it is desirable that particles containing the first group element are dispersed on the outermost surface of the surface layer portion, and the second group element is deposited between the particles containing the first group element.

The present invention, in addition, relates to a lithium battery provided with: a positive electrode case; a positive electrode housed in the positive electrode case; a negative electrode case; a negative electrode housed in the negative electrode case; a separator interposed between the positive electrode and the negative electrode; and a non-aqueous electrolyte having lithium ion conductivity. The positive electrode case is composed of a metal sheet having a surface layer portion containing a first metal element, the metal sheet including a stainless steel plate or a stainless steel plate having a nickel-plated layer. The surface layer portion is in contact with the positive electrode, and on an outermost surface of the surface layer portion, at least a part of the first metal element is substituted by a second metal element having a nobler standard electrode potential than the first metal element. The second metal element is deposited on the outermost surface in a state of a particulate metal, oxide or hydroxide.

The present invention, in addition, relates to a method for producing a material for contact components or battery components, including the step of bringing a surface layer portion of a metal sheet having the surface layer portion containing a first metal element, into contact with an aqueous solution containing an ion of a second metal element, so that at least a part of the first metal element existing on the surface layer portion is substituted by the second metal element in which the metal sheet includes a Cr-containing steel plate or a surface-treated steel plate, and the second metal element has a nobler standard electrode potential than the first metal element.

In the above method, it may be desirable to bring an acid solution in contact with the surface layer portion before bringing the surface layer portion into contact with the aqueous solution containing an ion of the second metal element.

The treatment solution used in the above method (the aqueous solution containing an ion of the second metal element), contains, for example: a metal ion (ion of the second metal element) being at least one selected from the group consisting of Pd, Pt, Ag, Au, In, Co, and Cu; an inorganic acid; and water.

Further, it is desirable that the treatment solution contains a complexing agent which, with the ion of the second metal element, forms a complex.

It is desirable that the treatment solution contains: an ion of a first group element, being at least one selected from the group consisting of Pd, Pt, Ag, and Au; and an ion of a second group element, being at least one selected from the group consisting of In, Co, and Cu.

In the present invention, contact components include, for example, battery holders, contact parts of various switches (e.g., bottom contact materials for keys of cell phones), and the like. Battery components include cases of various shapes, current collectors, negative electrode sealing plates, positive electrode substrates, positive electrode rings, and the like. The present invention is suitable as battery components, most notably, as positive electrode cases of lithium batteries, alkaline batteries, and the like.

Effects of the Invention

According to the present invention, a material for contact components or battery components which can stably maintain a low surface resistance value for a long period of time can be provided at a low cost. The material for contact components or battery components of the present invention has a surface resistance value, which is same as or less than the conventional ones, as well as corrosion resistance, workability, solderability, and the like, which are same as or greater than the conventional ones, and even in the case of storage in a constant-temperature constant-humidity chamber, the increase in the surface resistance value is small.

BEST MODE FOR CARRYING OUT THE INVENTION

A material for contact components or battery components of the present invention includes a metal sheet having, on at least one face, a surface layer portion containing a first metal element. The metal sheet includes a Cr-containing steel plate or a surface-treated steel plate. At least a part of the first metal element is substituted by a second element on an outermost surface of the surface layer portion, containing the first metal element and which is on at least one face. In order for a substitution reaction to proceed, in which the first metal element is substituted by the second metal element, the standard electrode potential of the second metal element is required to be nobler than the standard electrode potential of the first metal element. Therefore, it is desirable that the second metal element is at least one selected from the group consisting of, for example, Pd, Pt, Ag, Au, In, Co, and Cu. There can be only one second metal element, or two or more second metal elements.

The second metal element is deposited on the outermost surface of the metal sheet in a state of a metal, oxide, or hydroxide. The second metal element is usually deposited in a shape of a particle, the particle having a diameter of 1 to 200 nm. However, it is to be noted that Pd, Pt, Ag, and Au (first group elements) tend to be deposited in a state of a particulate metal. On the other hand, In, Co, and Cu (second group elements) tend to be deposited in a state of a particulate metal, oxide, or hydroxide.

A typical method for producing a material for contact components or battery components of the present invention, includes the step of bringing a surface layer portion of a metal sheet having the surface layer portion containing a first metal element, into contact with an aqueous solution (treatment solution) containing an ion of a second metal element, so that at least a part of the first metal element existing on the surface layer portion is substituted by the second metal element. However, it is to be noted that the metal sheet includes a Cr-containing steel plate or a surface-treated steel plate, and the second metal element has a nobler standard electrode potential than the first metal element. Here, a steel plate includes a steel strip. The steel strip can be obtained in a coil-like wound state.

In the case where the metal sheet is a common Cr-containing steel plate, the first metal element is a constituent element (e.g., Fe) of the Cr-containing steel plate. In the case where the metal sheet is a surface-treated steel plate, the first metal element is, usually, a metal element used for surface treatment. There can be only one first metal element, or two or more first metal elements.

Basically, the material for contact components or battery components of the present invention is produced by making use of a substitution reaction. In the substitution reaction, at the time the first metal element (e.g., Fe), existing on the outermost surface of the surface layer portion of the metal sheet, is dissolved into the treatment solution, electrons are released (e.g., $Fe \rightarrow Fe^{2+} + 2e^-$). The released electrons are received by the ions of the second metal element existing in the treatment solution, and due to this, it is considered that the second metal element is deposited on the outermost surface.

For the Cr-containing steel plate, stainless steel plates such as SUS304, SUS430, SUS444, and the like can be suitably used. However, it is to be noted that: a non-stainless steel plate having a Cr content of less than 12 wt %; a steel plate which is a non-stainless steel plate added with titanium, niobium, and the like, thereby having increased workability; and the like can also be suitably used.

For the surface-treated steel plate, a surface-treated Cr-containing steel plate, a surface-treated cold-rolled steel plate, and the like can be suitably used. Among the cold-rolled steel plates, an aluminum-killed cold-rolled steel plate can be suitably used in particular. A low-carbon steel containing about 0.04 wt % of carbon; an ultra low-carbon steel containing no more than 0.003 wt % of carbon; and the like, as well as a cold-rolled steel plate which is an ultra low-carbon steel added with titanium, niobium, boron, and the like, thereby improving anisotropy, aging, weldability, and the like, can also be suitably used.

Surface treatment of the surface-treated steel plate is mainly performed by an electroplating method. For example, nickel plating, nickel alloy plating, tin plating, tin alloy plating, copper plating, copper alloy plating, and the like are performed on a steel plate. That is, as the surface-treated steel plate, a stainless steel plate having a plated layer and a cold-rolled steel plate having a plated layer are suitable, and the first metal element is usually a constituent element of the plated layer. Meanwhile, surface treatment in which the plated layer is of an element other than Ni, Sn, and Cu may also be performed, and surface treatment by means of a chemical plating method, a vapor deposition method, and the like may also be performed.

It is desirable that the second metal element includes a first group element, being at least one selected from the group consisting of Pd, Pt, Ag, and Au, and a second group element, being at least one selected from the group consisting of In, Co, and Cu. The first group element: has a standard electrode potential which differs greatly in comparison to that of the first metal element; can easily disperse on the outermost surface of the surface layer portion containing the first metal element; is not easily oxidized; and has a high conductivity, but is relatively expensive. The second group element: has a standard electrode potential which differs less in comparison to that of the first metal element; and does not show a physical property as good as that of the first group element, but is relatively inexpensive. By combining the first group element and the second group element for use as the second metal element, the production cost of the material for contact components and battery components can be lowered. In addition, the dispersibility of the first group element can be improved.

Figure 1:
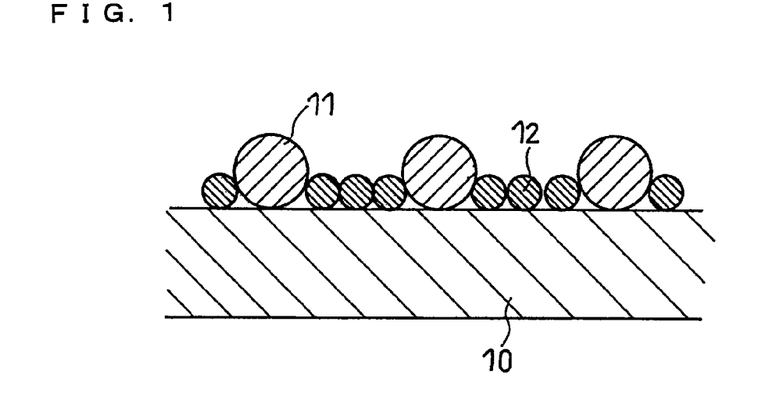
FIG. 1 is a view schematically showing one embodiment of a surface layer portion of a material for contact components or battery components of the present invention.

In FIG. 1, one embodiment of a surface layer portion of a material for contact components and battery components of the present invention, is schematically shown. Here, the case where Pd and In are combined for use as a second metal element, is described.

For example, in the case where, on an outermost surface of a stainless steel plate 10, a part of iron which is a first metal element is substituted by Pd and In which are the second metal elements, Pd particles 11 in a metallic state disperse on the outermost surface, and In particles 12 in an oxide state are deposited between the Pd particles 11. In such a structure, the Pd particles 11 are stabilized by the In particles 12. Since the Pd particles 11, highly conductive and chemically stable, exist in a highly dispersed state on the outermost surface of the stainless steel plate 10, a low surface resistance value is maintained for a long period of time.

Figure 2:
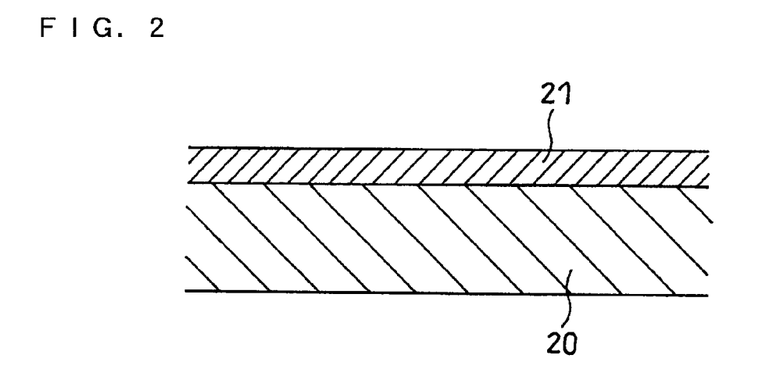
FIG. 2 is a view schematically showing the condition of a Pd-plated layer 21 formed on a surface of a stainless steel plate 20.

In FIG. 2, the state in which a Pd-plated layer 21 is formed on a stainless steel plate 20, is schematically shown. In the plating method, a uniform plated layer is formed on a surface of the stainless steel plate. In order to form the uniform plated layer by using a second metal element, the second metal element will be required in a relatively large amount. For example, in the case of forming the Pd-plated layer having a thickness of 0.1 μm, Pd will be required about 40 times more than the case where Pd is highly dispersed as in FIG. 1, and thus, the cost will be extremely high.

In the material for contact components or battery components of the present invention, the amount of the second metal element deposited on the outermost surface of the metal sheet is desirably 1 to 50 mg/m$^2$, and more desirably, 5 to 30 mg/m$^2$. If the amount of the second metal element is more than the above, the cost becomes higher, and if less, the effect of lowering the surface resistance value may become small.

In the case where the first group element and the second group element is combined for use as the second metal element, the weight ratio between the first group element and the second group element deposited per unit area of the metal sheet is desirably (the first group element:the second group element)=(1:1) to (100:1), and more desirably, (the first group element:the second group element)=(3:1) to (10:1). If the amount of the second group element is too excessive in contrast to the first group element, the effect of lowering the surface resistance value may become small, and if the amount of the second group element is too small, the effect of stabilizing the first group element in a highly-dispersed state cannot be sufficiently obtained.

In the method for producing the material for contact components or the battery components in the present invention, there is no particular limit to the method in which the surface layer portion of the metal sheet is brought into contact with the aqueous solution (treatment solution) containing an ion of the second metal element, although dipping or spraying (blowing, atomizing), for example, are applicable. According to these methods, the treatment solution can be uniformly provided on the surface layer portion of the metal sheet, which is required to proceed with the substitution reaction, even in the cases where the surface layer portion has a complex shape, a large area, and the like. Thus, a uniform surface treatment can be performed on the metal sheet.

Usually, on the outermost surface of a Cr-containing steel plate, a Cr oxide layer and the like exist. Thus, in the case where the metal sheet is a Cr-containing steel plate, in order to substitute the first metal element by the second metal element, the Cr oxide layer existing on the outermost layer is required to be removed in advance. The Cr oxide layer can be readily removed, for example, by means of dipping, enabling an acid solution to be brought into contact with the surface layer portion of the metal sheet, the surface layer portion being required to proceed with the substitution reaction. As the acid solution, for example, an aqueous solution of an inorganic acid (such as hydrochloric acid, sulfuric acid, nitric acid, and the like) of pH 0.1 to 2.0 can be used.

It is desirable that the treatment solution contains at least one selected from the group consisting Pd, Pt, Ag, Au, In, Co, and Cu, as an ion of the second metal element. These ions contained in the treatment solution can be of a single element, or two or more elements.

The treatment solution can be prepared by dissolving into water, a water-soluble metal salt containing the second metal element.

In the case where Pd is the second metal element, Pd salts such as palladium nitrate, palladium sulfate, palladium chloride, and the like can be used as the water-soluble metal salt. In the case where Pt is the second metal element, Pt salts such as platinum chloride, potassium chloroplatinate, and the like can be used as the water-soluble metal salt. In the case where Ag is the second metal element, Ag salts such as silver nitrate, silver acetate, silver cyanide, and the like can be used as the water-soluble metal salt. In the case where Au is the second metal element, Au salts such as gold cyanide, potassium gold cyanide, gold sulfite, gold chloride, and the like can be used as the water-soluble metal salt. In the case where In is the second metal element, In salts such as indium nitrate, indium sulfate, indium chloride, and the like can be used as the water-soluble metal salt. In the case where Co is the second metal element, Co salts such as cobalt nitrate, cobalt sulfate, cobalt acetate, and the like can be used as the water-soluble metal salt. In the case where Cu is the second metal element, Cu salts such as copper nitrate, copper sulfate, copper acetate, copper chloride, and the like can be used as the water-soluble metal salt.

In the substitution reaction, the greater the standard electrode potential of the second metal element differs from that of the first metal element, the larger the deposition rate tends to become for that second metal element. Thus, noble metals (first group elements) such as Pd, Pt, Ag, Au, and the like have an extremely large deposition rate, and tend to be deposited in a shape of a coarse particle having a three dimensional structure. Usually, contact components, battery components, and the like are fabricated by performing a molding process, such as press-forming, on a plate material. With respect to the noble metal in the shape of a coarse particle, separation and detachment may occur due to the molding process.

The surface resistance value of the material for contact components or battery components depends on the amount of the second metal element existing on that surface. If the amount of the second metal element existing on the surface decreases due to the molding process, the surface resistance value may increase with the passing of time. Thus, it is preferable that the growth of the particle is suppressed, so that the second metal element does not form a coarse particle having a three dimensional structure.

In order to suppress the growth of the coarse particle, using the first group element, whose standard electrode potential differs relatively greatly in comparison to that of the first metal element, in combination with the second group element, whose standard electrode potential differs relatively less in comparison to that of the first metal element, will be effective. By using a treatment solution in which the first group element and the second group element are made to coexist, the growth of the coarse particle composed of the first group element is suppressed. Thus, at the time the molding process is performed for the material for contact components or battery components, it becomes possible for the second metal element to suppress separation or detachment from the material. Meanwhile, the particle formed from the first group element is desirably 1 to 200 nm in diameter, and a particle formed from the second group element is desirably 1 to 200 nm in diameter. In particular, the combination of Pd, which is the first group element, and In, which is the second group element, is desirable from the aspect of the dispersibility of Pd tending to easily increase.

In the surface layer portion of the stainless steel plate, Fe, Ni, and the like, which are first metal elements, are contained. In the surface layer portion of the cold-rolled steel plate, Fe, which is the first metal element, is contained. In the surface layer portion of the surface-treated steel plate having a nickel-plated layer, Ni, which is the first metal element, is contained. In, Co, Mo, and the like can be given as the second metal element, whose standard electrode potential differs less in comparison to that of Fe. Mo, Cu, Sn, and the like can be given as the second metal element, whose standard electrode potential differs less in comparison to that of Ni.

Although the ion concentration of the second metal element contained in the treatment solution is not particularly limited, 0.001 to 20 g/L, for example, is desirable. However, it is to be noted that, since the first group element has an extremely noble standard electrode potential and a large deposition rate, it would be better that the ion concentration of the first group element contained in the treatment solution is not too high. In addition, since the first group element is expensive, it would be preferable that the used amount is small. Thus, the ion concentration of the first group element contained in the treatment solution is desirably 0.001 to 10 g/L, and more desirably, 0.01 to 1 g/L. On the other hand, since the second metal element has a standard electrode potential which differs relatively less in comparison to that of the first metal element and a small deposition rate, it is preferable that the ion concentration of the second group element contained in the treatment solution is higher than the ion concentration of the first group element. Although not particularly limited, the ratio of the ion concentration of the second group element ($C^2$) and the ion concentration of the first group element ($C^1$):($C^2/C^1$) is, for example, 5 to 500, and desirably, 10 to 100.

In order for the substitution reaction to proceed, the first metal element is required to be eluted out, from the surface layer portion of the metal sheet, into the treatment solution. From the perspective of promoting the elution of the first metal element, it is desirable that the treatment solution is acidic. With respect to pH of the treatment solution, being within the range in which the elution of the first metal element proceeds is applicable, although being within the range of 0.1 to 7 is particularly desirable. By allowing an organic acid (such as acetic acid) or an inorganic acid (such as hydrochloric acid, sulfuric acid, and nitric acid) to be contained in the treatment solution, the treatment solution can be made acidic.

In the case where attempts are made to continuously perform the substitution reaction, the ion concentration of the first metal element (e.g., $Fe^{2+}$ ion concentration) in the treatment solution gradually increases. In the case where $Fe^{2+}$ ion concentration increases, there is a possibility that $Fe^{2+}$ ions are oxidized to $Fe^{3+}$ ions, thereby reducing the second metal element coexisting in the treatment solution. Thus, there is a possibility that the ions of the second metal element are deposited as metal, thereby rapidly lowering the ion concentration of the second metal element and disrupting the proceeding of the substitution reaction.

Given this factor, it is preferable to allow a complexing agent, which supplements the ions of the second metal element, be contained in the treatment solution. Although not particularly limited, as usable complexing agents, organic carboxylic acid-based complexing agents such as citric acid, malic acid, gluconic acid, lactic acid, acetic acid, oxalic acid, succinic acid, formic acid, and the like, and nitrogen-containing compound-based complexing agents such as EDTA (Ethylene Diamine Tetraacetic Acid), DTPA (Diethylene Triamine Pentaacetic Acid), glycine, alanine, asparagine acid, iminodiacetic acid, glutamic acid, and the like, can be given. The concentration of the complexing agent contained in the treatment solution is desirably a molar concentration which is 0.1 to 10 times as much per the number of moles of the ions of the second metal element, and particularly desirably, 0.5 to 5 times as much.

Although the treatment temperature (the temperature of the treatment solution and the metal sheet at the time of bringing the surface layer portion of the metal sheet into contact with the treatment solution) is not particularly limited, 25° C. to 70° C. is desirable. However, it is to be noted that in the case where the treatment solution contains acid, if the treatment temperature is set to an excessively high temperature, there may be problems such as corrosion of treatment equipment and the like. In addition, in the case of using a highly corrosion-resistant stainless steel plate (e.g., SUS444 material) and the like as the metal sheet, if the treatment temperature is set excessively low, the dissolution rate of Fe becomes small, and the time required for the substitution reaction becomes longer. Thus, the treatment temperature is most desirable at 30° C. to 50° C.

The material for battery components of the present invention is suitable, particularly as the material of a positive electrode case of a lithium battery, alkaline battery, and the like. In the case where the material for battery components of the present invention is used, for example, as a positive electrode case of an alkaline battery, a carbon paste, usually required to be uniformly applied on the inner face of the positive electrode case, becomes unnecessary. In addition, in the case where the material for battery components of the present invention is used as a material of a positive electrode case of a lithium battery, the material can be applied to both a lithium primary battery and a lithium secondary battery. The material for battery components of the present invention is particularly useful as a positive electrode case of a coin-type or button-type lithium primary battery.

A coin-type or button-type lithium primary battery is provided with: a positive electrode case; a positive electrode housed in the positive electrode case; a negative electrode case; a negative electrode housed in the negative electrode case; a separator interposed between the positive electrode and the negative electrode; and a non-aqueous electrolyte having lithium ion conductivity. Here, the positive electrode case is composed of a metal sheet having a surface layer portion containing a first metal element, and the metal sheet includes a stainless steel plate or a stainless steel plate having a nickel-plated layer. The surface layer portion is in contact with the positive electrode, and at least a part of the first metal element on an outermost surface of the surface layer portion is substituted by a second metal element. The second metal element has a nobler standard electrode potential than the first metal element, and is deposited on the outermost surface in a state of a particulate metal, oxide, or hydroxide.

Lithium primary batteries include a CR-type battery provided with a positive electrode containing manganese dioxide, and a BR-type battery provided with a positive electrode containing graphite fluoride and the like. Hereinafter, one embodiment of a lithium primary battery will be described.

A positive electrode of a lithium primary battery, for example, contains manganese dioxide or graphite fluoride as an indispensable component, and a conductive material such as graphite and carbon black as an optional component. For manganese dioxide, although not particularly limited, λ-type manganese oxide, β-type manganese oxide, and the like can be used. Graphite fluoride is, for example, represented as $(CF_x)_n$ ($0.5<x<1$). It is preferable that the manganese element of manganese dioxide is partially substituted by a different element. As the different element, elements such as Mg, Al, Fe, Ca, Cr, Ti, V, Co, Ni, Cu, and Zn can be used. Although the reason is not clear, using magnesium is most effective in suppressing manganese dissolution and improving discharge characteristics.

For a negative electrode of a lithium primary battery, at least one selected from the group consisting of lithium and lithium alloy is used. Lithium, lithium alloy, and the like can be either used alone, or combinedly. As a desirable lithium alloy, lithium-aluminum alloy (Li—Al alloy) and the like can be given. With respect to the lithium alloy, from the perspective of securing discharge capacity and stabilizing internal resistance, it is preferable that the amount of a metal element other than lithium contained in the lithium alloy is 0.2 wt % to 15 wt %.

As the non-aqueous electrolyte having lithium ion conductivity, a non-aqueous solvent and a lithium salt dissolved therein are used. As the non-aqueous solvent, cyclic carbonic acid ester, chain carbonic acid ester, cyclic ether, chain ether, lactones, and the like can be used alone, or by combining two or more of the above. As the lithium salt, LiClO$_4$, LiCF$_3$SO$_3$, LiN(CF$_3$SO$_2$)$_2$, LiBF$_4$, LiPF$_6$, and the like can be either used alone, or by combining two or more of the above.

For the separator, for example, polyolefin woven fabric, non-woven fabric, microporous film, and the like can be used.

Hereinafter, the present invention will be described more specifically with reference to the Examples.

EXAMPLE 1

(i) Metal Sheet

On the premise that Fe, as a first metal element, was eluted into the treatment solution, a stainless steel plate (SUS430) was used for a metal sheet. A cathodic electrolytic degreasing of the stainless steel plate was performed, and subsequently, pretreatment was performed, in which the stainless steel plate was immersed in a hydrochloric acid aqueous solution (HCl concentration of 35 wt %, pH 1 or less) of 30° C. for 1 minute. Meanwhile, for the "Hydrochloric Acid Immersion" column in Tables 1 to 2, a "○" is indicated for the case where immersion using hydrochloric acid aqueous solution was performed, and a "×" for the case where the immersion was not performed.

(ii) Preparation of Treatment Solution

Treatment solutions having various compositions, as shown in Tables 1 to 2, were prepared.

For a water-soluble metal salt containing a second metal element, indium sulfate, silver nitrate, palladium chloride, and chlorauric acid were used alone, or by combining two or more of the above. In Tables 1 to 2, the amounts of these metal salts contained in the treatment solutions are shown. For example, the indication of "10 g/L" for indium sulfate shows that 10 g of indium sulfate were contained in 1 L of the treatment solution containing metal salt, inorganic acid, and complexing agent.

For the inorganic acid, hydrochloric acid having a HCl concentration of 35 wt % (35% hydrochloric acid) and sulfuric acid having a H$_2$SO$_4$ concentration of 62 wt % (62% sulfuric acid) were used alone, or combinedly. In Tables 1 to 2, the amounts of these inorganic acids contained in the treatment solutions are shown. For example, the indication of "100 ml/L" for 35% hydrochloric acid shows that 100 mL of 35% hydrochloric acid were contained in 1 L of the treatment solution containing water-soluble met-al salt, inorganic acid, and complexing agent (one-tenth of the volume of the treatment solution was hydrochloric acid aqueous solution).

For the complexing agent, citric acid, gluconic acid, and malic acid were used alone, or by combining two or more of the above. In Tables 1 to 2, the amounts of these complexing agents contained in the treatment solutions are shown. For example, the indication of "20 g/L" for citric acid shows that 20 g of citric acid were contained in 1 L of the treatment solution containing metal salt, inorganic acid, and complexing agent.

(iii) Substitution Reaction

A metal sheet after pretreatment was immersed in the treatment solution. Immersion durations and treatment temperatures are shown in Tables 1 to 2. During this immersion, at least a part of the Fe existing on a surface layer portion of a stainless steel plate was substituted by a second metal element, being In, Ag, Pd, or Au.

[Evaluation]

(i) Deposition Condition of Second Metal Element

The surface of the stainless steel plate, after the substitution reaction, was analyzed by a X-ray photoelectron spectroscopy (XPS), and the condition of the deposited second metal element was evaluated. The results are shown in Tables 1 to 2.

(ii) Residual Percentage of Second Metal Element After Press-forming

A positive electrode case of a lithium primary battery was fabricated, by press-forming a stainless steel plate, after substitution reaction, into a bottomed cylindrical shape having a diameter of 24 mm and a height of 4 mm. An inner face of the resulting positive electrode case was analyzed by XPS, and the residual ratio of the second metal element after press-forming to the same before press-forming, was obtained in percentage. The results are shown in Tables 1 to 2.

(iii) Initial Contact Resistance Value

A contact resistant value of the inner face of the positive electrode case immediately after press-forming was determined in the following manner:

To 100 parts by weight of manganese dioxide, were added 5 parts by weight of Ketjen Black as a conductive material and 5 parts by weight of polytetrafluoroethylene (PTFE) as a binder, and then sufficiently mixed to obtain a positive electrode mixture. This positive electrode mixture was formed into a disc shape having a diameter of 20 mm and a thickness of 3.0 mm, then dried at 250° C., and the resultant was referred as a positive electrode. The resulting positive electrode was disposed at the center of the inner face of the positive electrode case, and at the center of a top surface of the positive electrode, a columnar-shaped stainless steel material with a gold-plated surface (diameter of 10 mm, height of 25 mm) was disposed. In this condition, the value of the resistance between the positive electrode case and the columnar-shaped stainless steel material was determined, and the resultant was referred as the contact resistance value. The results are shown in Tables 1 to 2. Meanwhile, the contact resistance value of a metal sheet, after pretreatment and before substitution reaction, was 30 to 40Ω.

(iv) Constant-Temperature Constant-Humidity Test

The positive electrode case, immediately after press-forming, was kept in a constant-temperature constant-humidity chamber of a temperature of 60° C. and a humidity of 90%, and 20 days later, the contact resistance value of the inner face of the positive electrode case was determined. For the "Constant-Temperature Constant-Humidity Test" column in Tables 1 to 2, "increased" is indicated for the case where an increase was seen in the contact resistance value, and "constant" is indicated for the case where almost no increase was seen. Meanwhile, the constant-temperature constant-humidity test was performed on a metal sheet, after pretreatment and before substitution reaction, and as a result, the contact resistance value increased significantly, the increase being by approximately 140Ω.

(v) Overall Evaluation

In Tables 1 to 2, in the case where the initial contact resistance value was 6Ω or more, or, in the case where an increase in the contact resistance value was admitted, a "×" was indicated, and a "○" was indicated for all other cases.

TABLE 1

| | SUS430 | Example 1-1 | Example 1-2 | Example 1-3 | Example 1-4 |
|---|---|---|---|---|---|
| Hydrochloric Acid Immersion | | X | X | ◯ | ◯ |
| Indium Sulfate | | 10 g/L | 10 g/L | | |
| Silver Nitride | | | | | |
| Palladium Chlorauric Acid | | | 0.1 g/L | 0.1 g/L | 0.05 g/L |
| 35% Hydrochloric Acid | | | 100 ml/L | 100 ml/L | 50 ml/L |
| 62% Sulfuric Acid | | 100 ml/L | | | |
| Citric Acid | | 20 g/L | 20 g/L | | |
| Gluconic Acid | | | | | |
| Malic Acid | | | | 10 g/L | 5 g/L |
| Treatment Temperature (° C.) | | 50 | 50 | 30 | 45 |
| Immersion Duration (sec) | | 10 | 16 | 20 | 30 |
| Deposition Condition of Second Metal Element | | X | Pd + In$_2$O$_3$ | Au | Pd |
| Residual Ratio of Second Metal Element after Press-forming (%) | | 40 | 30 | 50 | 50 |
| Contact Resistance Value (Ω) | 30.0~40.0 | 20.0 | 13.0 | 5.0 | 4.0 |
| Constant-Temperature Constant-Humidity Test | increased | increased | increased | constant | constant |
| Overall Evaluation | X | X | X | ◯ | ◯ |

TABLE 2

| | Example 1-5 | Example 1-6 | Example 1-7 | Example 1-8 |
|---|---|---|---|---|
| Hydrochloric Acid Immersion | ◯ | ◯ | ◯ | ◯ |
| Indium Sulfate | 10 g/L | 10 g/L | 5 g/L | 3 g/L |
| Silver Nitride | 1 g/L | | | |
| Palladium Chloride | | 0.1 g/L | | 0.05 g/L |
| Chlorauric Acid | | | 0.1 g/L | |
| 35% Hydrochloric Acid | | 80 ml/L | 100 ml/L | 50 ml/L |
| 62% Sulfuric Acid | 100 ml/L | | | |
| Citric Acid | 20 g/L | 20 g/L | | |
| Gluconic Acid | | | | |
| Malic Acid | | 5 g/L | 10 g/L | 15 g/L |
| Treatment Temperature (° C.) | 50 | 50 | 30 | 45 |
| Immersion Duration (sec) | 10 | 16 | 20 | 30 |
| Deposition Condition of Second Metal Element | Ag + In$_2$O$_3$ | Pd + In$_2$O$_3$ | Au + In$_2$O$_3$ | Pd + In$_2$O$_3$ |
| Residual Ratio of Second Metal Element after Press-forming (%) | 70 | 70 | 75 | 70 |
| Contact Resistance Value (Ω) | 3.5 | 3.0 | 3.5 | 2.0 |
| Constant-Temperature Constant-Humidity Test | constant | constant | constant | constant |
| Overall Evaluation | ◯ | ◯ | ◯ | ◯ |

EXAMPLE 2

Figure 3:
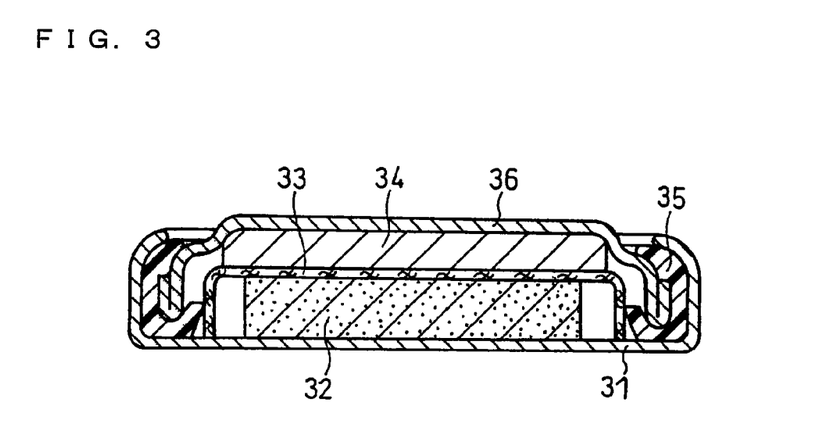
FIG. 3 is a vertical sectional view of a coin-type lithium primary battery according to the Examples of the present invention.

A coin-type lithium primary battery, having a structure as shown in FIG. 3, was fabricated by using the positive electrode case fabricated in Examples 1-8.

(i) Fabrication of Positive Electrode

A positive electrode was fabricated, similar to the one fabricated at the time of determining the initial contact resistance value. That is, to 100 parts by weight of manganese dioxide, were added 5 parts by weight of Ketjen Black as a conductive material and 5 parts by weight of polytetrafluoroethylene (PTFE) as a binder, and then sufficiently mixed to obtain a positive electrode mixture. This positive electrode mixture was formed into a disc shape having a diameter of 20 mm and a thickness of 3.0 mm, then dried at 250° C., and the resultant was referred as the positive electrode.

(ii) Fabrication of Negative Electrode

A disc shape having a diameter of 20 mm was punched out of a metallic lithium having a thickness of 1.0 mm, and this was used as a negative electrode.

(iii) Preparation of Non-aqueous Electrolyte

Lithium perchlorate was dissolved, at a concentration of 1 mol/L, in a mixed solvent of propylene carbonate and 1,2-dimethoxyethane at a volume ratio of 6:4, and the resultant was referred as a non-aqueous electrolyte.

(iv) Fabrication of Lithium Primary Battery

A coin-type lithium primary battery (CR2450) having a diameter of 24 mm and a thickness of 5.0 mm, as shown in FIG. 3, was fabricated, and the resultant was referred as Battery A. Battery A was assembled in the following manner.

A positive electrode 32 was placed on the center of an inner face of a positive electrode case 31 (a case formed by press-forming the material of Example 1-8). On top of the positive electrode 32, a separator 33 composed of a polypropylene non-woven fabric was covered. Next, from top of the separator 33, a non-aqueous electrolyte (not shown) of a predetermined amount was injected into the positive electrode case 31.

A negative electrode 34 (metallic lithium) was pressed onto an inner face of a negative electrode case 36 (a case formed by press-forming a stainless steel plate, same as the metal sheet of Example 1-8). A gasket 35, formed by injection-molding a polypropylene resin in a circular pattern, was disposed around the peripheral edge of the negative electrode case 36. At the interface between the gasket 35 and the peripheral edge of the negative electrode case 36, a sealant, whose main component was asphalt, was interposed.

At an opening of the positive electrode case 31, the gasket 35, integrated together with the negative electrode case 36, was inserted, and then, the opening was sealed. At an interface between the gasket 35 and the inner periphery of the positive electrode case 31, the sealant, whose main component was asphalt, was interposed. Subsequently, an upper end portion of the opening of the positive electrode case 31 was bent inward and crimped onto the gasket 35, and thus, Battery A was completed.

COMPARATIVE EXAMPLE 1

A positive electrode case was fabricated by press-forming a non-surface-treated stainless steel plate.

To a circular area having a diameter of 17 mm at the center of an inner face of the positive electrode case, a conductive carbon paste was applied, the applied thickness being approximately 30 µm. The conductive carbon paste was a paste obtained by mixing 30 parts by weight of graphite powder, whose average particle size was 10 µm, and 70 parts by weight of ion-exchanged water. Subsequently, the positive electrode case was dried with hot air of 150° C. for 8 or more hours. Other than using the positive electrode case having the conductive carbon layer obtained as the above, Battery B of Comparative Example 1 was fabricated in the same manner as Battery A of Example 2.

<Evaluation>

(i) Battery Characteristics at 60° C.

Figure 5:
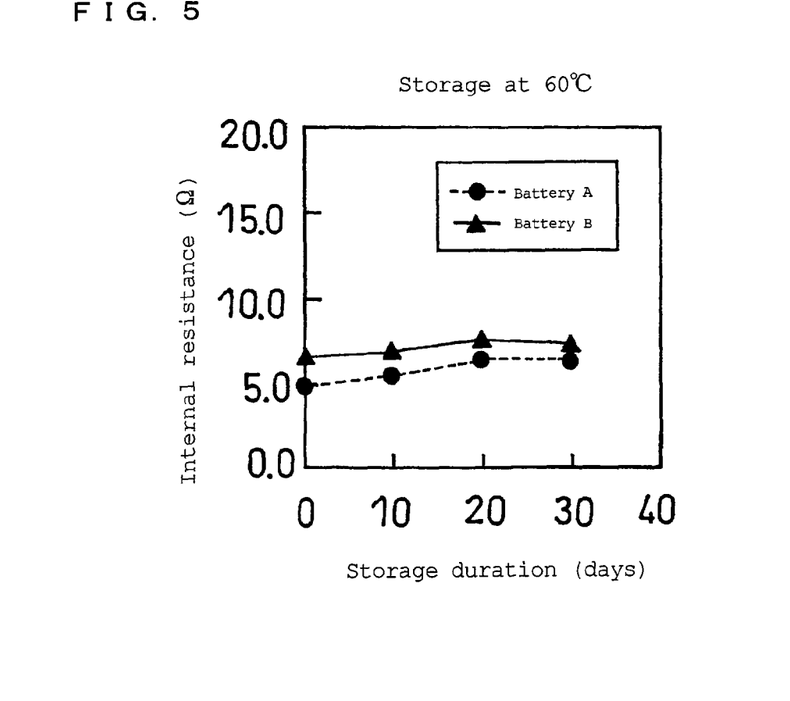
FIG. 5 is a graph showing the relation between storage duration and internal resistance at the time of storing a lithium primary battery (Batteries A and B) in a constant-temperature constant-humidity chamber of a temperature of 60° C. and a humidity of 10%.
Figure 6:
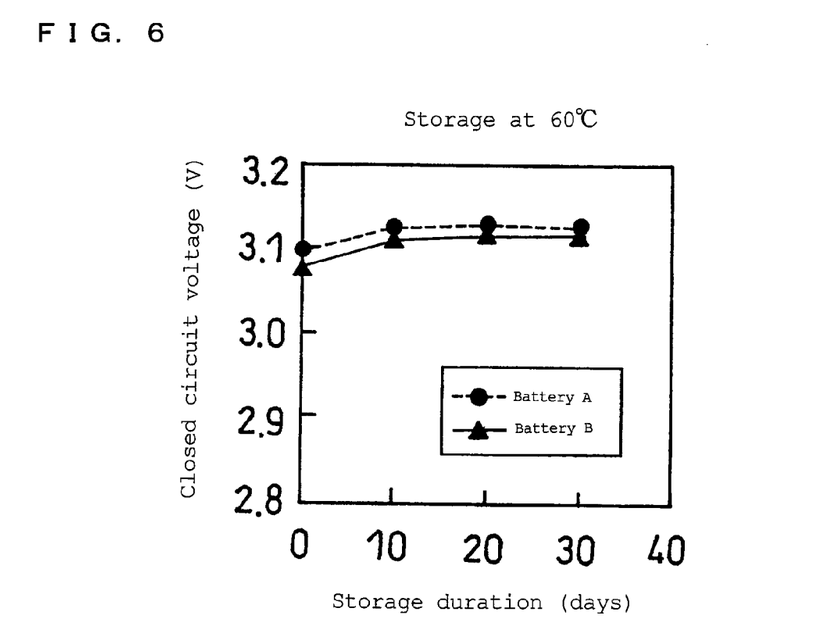
FIG. 6 is a graph showing the relation between storage duration and closed circuit voltage at the time of storing a lithium primary battery (Batteries A and B) in a constant-temperature constant-humidity chamber of a temperature of 60° C. and a humidity of 10%.

Batteries A and B, at their initial stages immediately after fabrication, were stored in a constant-temperature constant-humidity chamber of a temperature of 60° C. and a humidity of 10%, and (a) the relation between storage duration and open-circuit voltage; (b) the relation between storage duration and internal voltage; and (c) the relation between storage duration and closed circuit voltage, were investigated. The results are shown in FIGS. 4 to 6.

(ii) Battery Characteristics at 60° C./90% Humidity

Figure 8:
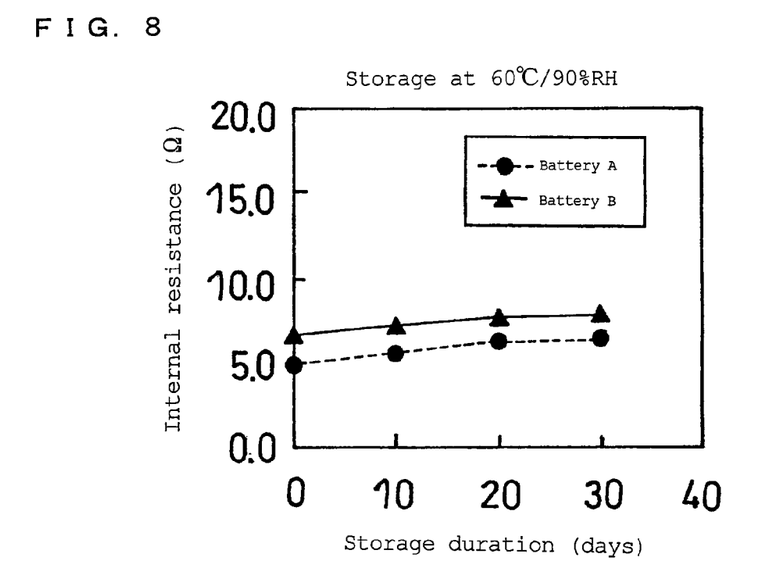
FIG. 8 is a graph showing the relation between storage duration and internal resistance at the time of storing a lithium primary battery (Batteries A and B) in a constant-temperature constant-humidity chamber of a temperature of 60° C. and a humidity of 90%.
Figure 9:
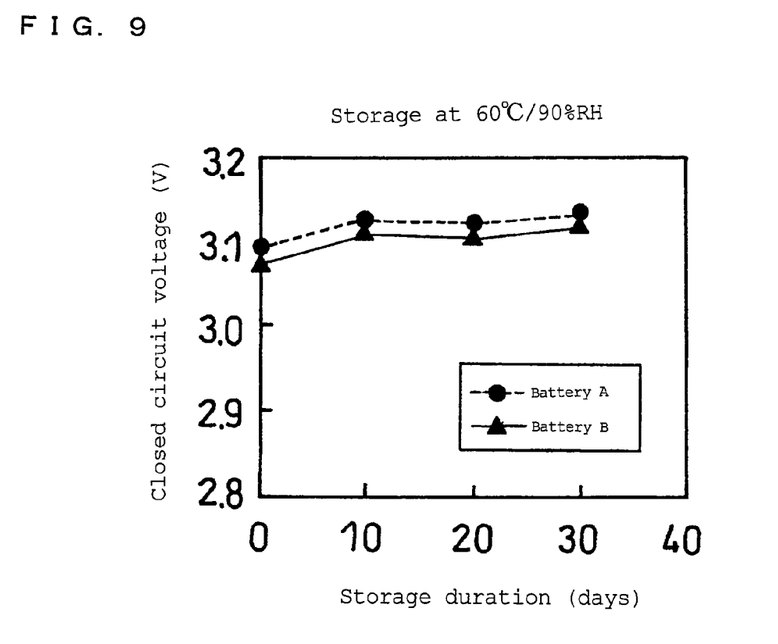
FIG. 9 is a graph showing the relation between storage duration and closed circuit voltage at the time of storing a lithium primary battery (Batteries A and B) in a constant-temperature constant-humidity chamber of a temperature of 60° C. and a humidity of 90%.

Batteries A and B, at their initial stages immediately after fabrication, were stored in a constant-temperature constant-humidity chamber of a temperature of 60° C. and a humidity of 90%, and (a) the relation between storage duration and open-circuit voltage; (b) the relation between storage duration and internal voltage; and (c) the relation between storage duration and closed circuit voltage, were investigated. The results are shown in FIGS. 7 to 9.

Figure 4:
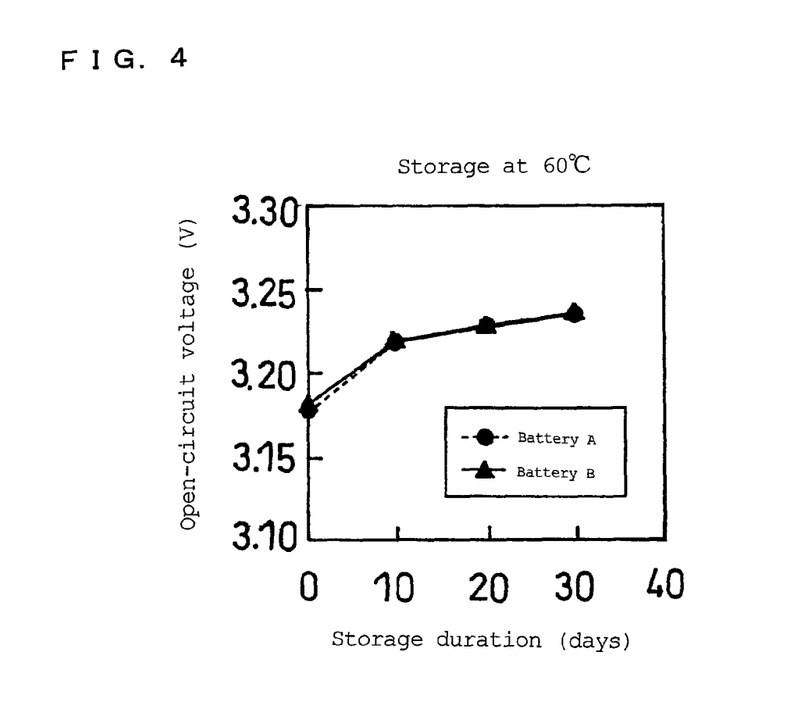
FIG. 4 is a graph showing the relation between storage duration and open-circuit voltage at the time of storing a lithium primary battery (Batteries A and B) in a constant-temperature constant-humidity chamber of a temperature of 60° C. and a humidity of 10%.
Figure 7:
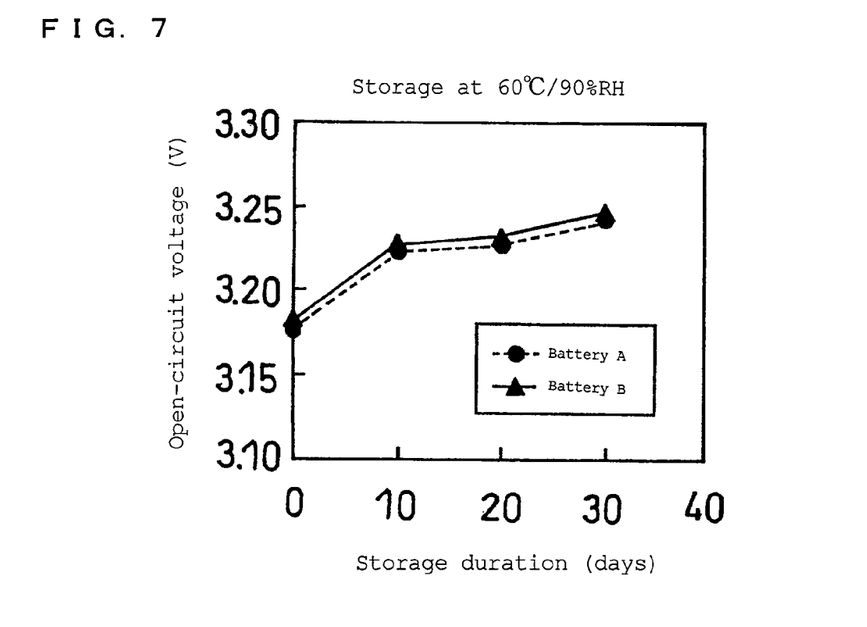
FIG. 7 is a graph showing the relation between storage duration and open-circuit voltage at the time of storing a lithium primary battery (Batteries A and B) in a constant-temperature constant-humidity chamber of a temperature of 60° C. and a humidity of 90%.

As shown in FIGS. 4 and 7, with respect to open-circuit voltage, both Batteries A and B progressed by nearly the same voltages. On the other hand, with respect to internal resistance value, as shown in FIGS. 5 and 8, regardless of storage condition and storage duration, Battery A progressed by values always lower than those of Battery B. In addition, with respect to closed circuit voltage, Battery A progressed by voltages higher than those of Battery B. The above results show that the contact resistance value between the positive electrode and the positive electrode case becomes lower in the case where Fe on the surface layer portion of the positive electrode case is substituted by Pd and In, than in the case where conductive carbon is applied to the positive electrode case.

[Industrial Applicability]

The present invention is applicable to various materials for contact components and battery components, but is particularly suitable for application to a positive electrode case of a lithium primary battery. Although the lithium primary battery of the present invention can be applied to, for example, high-quality tire pressure monitoring (management) system (TPMS) and the like, usage is not particularly limited.

The invention claimed is:

1. A material for contact components or battery components, the material comprising a metal sheet having a surface layer portion containing a first metal element,
    wherein said metal sheet comprises a Cr-containing steel plate or a surface-treated steel plate,
    at least a part of said first metal element on an outermost surface of said surface layer portion is substituted by a second metal element having a nobler standard electrode potential than said first metal element, and
    said second metal element is deposited on said outermost surface in a state of a particulate metal, oxide, or hydroxide,
    an amount of the second metal element deposited on the outermost surface of the metal sheet is 5 to 50 mg/m$^2$,
    said second metal element contains:
        a first group element, being at least one selected from the group consisting of Pd, Pt, Ag, and Au; and
        a second group element, being at least one selected from the group consisting of In, Co, and Cu, and
    the first group and second group elements are both deposited on and in direct contact with the outermost surface of the metal sheet.

2. The material for contact components or battery components in accordance with claim 1,
    wherein said Cr-containing steel plate comprises a stainless steel plate, and
    said first metal element is iron.

3. The material for contact components or battery components in accordance with claim 1,
    wherein said surface-treated steel plate comprises a stainless steel plate having a plated layer or a cold-rolled steel plate having a plated layer,
    said plated layer containing said first metal element, and,
    said first metal element being at least one selected from the group consisting of Ni, Sn, and Cu.

4. The material for contact components or battery components in accordance with claim 1,
    wherein particles containing said first group element are dispersed on said outermost surface, and said second group element is deposited between said particles.

5. A lithium battery comprising: a positive electrode case; a positive electrode housed in said positive electrode case; a negative electrode case; a negative electrode housed in said negative electrode case; a separator interposed between said positive electrode and said negative electrode; and a non-aqueous electrolyte with lithium ion conductivity, said positive electrode case comprising a metal sheet having a surface layer portion containing a first metal element,
said metal sheet comprising a Cr-containing steel plate or a surface-treated steel plate,
said surface layer portion being in contact with said positive electrode, and
at least a part of said first metal element on an outermost surface of said surface layer portion being substituted by a second metal element having a nobler standard electrode potential than said first metal element,
said second metal element being deposited on said outermost surface in a state of a particulate metal, oxide or hydroxide,
an amount of the second metal element deposited on the outermost surface of the metal sheet is 5 to 50 mg/m$^2$,
said second metal element contains:
a first group element, being at least one selected from the group consisting of Pd, Pt, Ag, and Au; and
a second group element, being at least one selected from the group consisting of In, Co, and Cu, and
the first group and second group elements are both deposited on and in direct contact with the outermost surface of the metal sheet.

6. A method for producing a material for contact components or battery components,
comprising the step of bringing a surface layer portion of a metal sheet having said surface layer portion containing a first metal element into contact with an aqueous solution containing an ion of a second metal element, so that at least a part of said first metal element existing on said surface layer portion is substituted by said second metal element,
wherein said metal sheet comprises a Cr-containing steel plate or a surface-treated steel plate,
said second metal element has a nobler standard electrode potential than said first metal element,
an amount of the second metal element deposited on the outermost surface of the metal sheet is 5 to 50 mg/m$^2$,
said second metal element contains:
a first group element, being at least one selected from the group consisting of Pd, Pt, Ag, and Au; and
a second group element, being at least one selected from the group consisting of In, Co, and Cu, and
the first group and second group elements are both deposited on and in direct contact with the outermost surface of the metal sheet.

7. The method for producing a material for contact components or battery components in accordance with claim 6,
wherein said surface layer portion, before brought into contact with said solution containing an ion of said second metal element, is brought into contact with an acid solution.

8. The material for contact components or battery components in accordance with claim 1, wherein an amount of the second metal element deposited on the outermost surface of the metal sheet is 5 to 30 mg/m$^2$.

9. The material for contact components or battery components in accordance with claim 1, wherein said second metal element is deposited on said outermost surface in a state of a particulate metal or oxide.

10. The material for contact components or battery components in accordance with claim 1, wherein:
the first group element is deposited on said outermost surface in a state of a particulate-metal, and
the second group element is deposited on said outermost surface in a state of a particulate oxide.

* * * * *